United States Patent
Wallén et al.

(10) Patent No.: US 11,291,009 B2
(45) Date of Patent: Mar. 29, 2022

(54) INDICATION OF MODULATION AND CODING SCHEME FOR WIRELESS DEVICE IN COVERAGE ENHANCED MODE

(71) Applicant: Telefonaktiebolaget LM Ericsson (publ), Stockholm (SE)

(72) Inventors: Anders Wallén, Ystad (SE); Johan Bergman, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 72 days.

(21) Appl. No.: 16/610,967

(22) PCT Filed: May 4, 2018

(86) PCT No.: PCT/EP2018/061605
§ 371 (c)(1),
(2) Date: Nov. 5, 2019

(87) PCT Pub. No.: WO2018/202895
PCT Pub. Date: Nov. 8, 2018

(65) Prior Publication Data
US 2020/0077381 A1 Mar. 5, 2020

Related U.S. Application Data

(60) Provisional application No. 62/502,381, filed on May 5, 2017.

(51) Int. Cl.
*H04W 72/04* (2009.01)
*H04B 1/7156* (2011.01)
(Continued)

(52) U.S. Cl.
CPC ........ *H04W 72/048* (2013.01); *H04B 1/7156* (2013.01); *H04L 27/0008* (2013.01);
(Continued)

(58) Field of Classification Search
None
See application file for complete search history.

(56) References Cited

U.S. PATENT DOCUMENTS

2015/0071199 A1* 3/2015 Matsumoto ....... H04W 72/0413
370/329
2016/0269213 A1 9/2016 Larsson et al.
(Continued)

FOREIGN PATENT DOCUMENTS

CN 103999528 A 8/2014
CN 104303440 A 1/2015
(Continued)

OTHER PUBLICATIONS

PCT Notification of Transmittal of the International Search Report and the Written Opinion of the International Searching Authority, or the Declaration for International application No. PCT/EP2018/061605—dated Jul. 18, 2018.
(Continued)

*Primary Examiner* — Rebecca E Song
(74) *Attorney, Agent, or Firm* — Baker Botts, LLP

(57) ABSTRACT

Some embodiments include a method performed by a network node for indicating a modulation and coding scheme for a wireless device operating in a coverage enhancement mode, wherein the wireless device operates with a first modulation and coding scheme using physical downlink shared channel repetitions and with a second modulation and coding scheme without using physical downlink shared channel repetitions, and wherein the second modulation and coding scheme is a higher order of modulation and coding than the first modulation and coding scheme, the method comprising configuring, when physical downlink shared channel repetitions are not used, the downlink control information to indicate one or more parameters related to the second modulation and coding scheme, the indication com-
(Continued)

prising at least the modulation and coding scheme field of the first modulation and coding scheme and one or more downlink control information field bits which are used in relation to repetitions when repetitions of a physical downlink shared channel are used.

24 Claims, 11 Drawing Sheets

(51) Int. Cl.
 *H04L 27/00* (2006.01)
 *H04L 27/38* (2006.01)
(52) U.S. Cl.
 CPC ......... *H04L 27/389* (2013.01); *H04W 72/042* (2013.01); *H04B 2001/71563* (2013.01); *H04B 2201/696* (2013.01)

(56) References Cited

U.S. PATENT DOCUMENTS

2019/0215810 A1* 7/2019 Mu ................... H04L 1/1896
2020/0163156 A1* 5/2020 Ye .......................... H04L 1/08

FOREIGN PATENT DOCUMENTS

CN 105493433 A 4/2016
WO WO2014021632 6/2014

OTHER PUBLICATIONS

3GPP TSG RAN WG1 Meeting #87; Reno, USA; Source: NTT DOCOMO; Title: Views on remaining issues of improving data rate for FeMTC (R1-1612700)—Nov. 14-18, 2016.

3GPP TSG-RAN WG1 Meeting #88bis; Spokane, U.S.; Source: Ericsson; Title: Increased PDSCH spectral efficiency for MTC (R1-1705195)—Apr. 3-7, 2017.

3GPP TSG-RAN WG1 Meeting #88bis; Spokane, USA; WF on increased PDSCH spectral efficiency; Huawei, HiSilicon (R1-1706410)—Apr. 3-17, 2017.

China Patent Office Official Action with attached Search Report in CN Application No. 201880445011.8 dated Oct. 9, 2021 (not translated).

* cited by examiner

INDICATION OF MODULATION AND CODING SCHEME FOR WIRELESS DEVICE IN COVERAGE ENHANCED MODE

PRIORITY

This nonprovisional application is a U.S. National Stage Filing under 35 U.S.C. § 371 of International Patent Application Serial No. PCT/EP2018/061605 filed May 4, 2018 and entitled "Indication of Modulation and Coding Scheme for Wireless Device in Coverage Enhanced Mode" which claims priority to U.S. Provisional Patent Application No. 62/502,381 filed May 5, 2017 both of which are hereby incorporated by reference in their entirety.

TECHNICAL FIELD

The present disclosure relates, in general, to wireless communications and, more particularly, to a modulation and coding scheme indication for eMTC devices supporting higher order modulation.

BACKGROUND

Long Term Evolution (LTE) Release 13 introduces a new bandwidth-reduced low-complexity (BL) user equipment (UE) type in the form of a new UE category M1 (Cat-M1). Compared to earlier LTE UE categories, Cat-M1 is associated with relaxed performance requirements in order to enable low-cost device implementations with low power consumption, characteristics suitable for many machine-type communications (MTC) applications. Cat-M1 is defined in Third Generation Partnership Project (3GPP) TS 36.306 "Evolved Universal Terrestrial Radio Access (E-UTRA); User Equipment (UE) radio access capabilities," V13.2.0 (2016 June) (hereinafter "3GPP TS 36.306").

Compared to higher LTE UE categories, a Cat-M1 UE supports a smaller maximum transport block size (TBS) of 1,000 bits and a smaller maximum channel bandwidth of 6 Physical Resource Blocks (PRBs), and can fulfill the standardized performance requirements using just a single receive antenna. Another characteristic that aims at reducing the complexity is that only modulation formats Quadrature Phase Shift Keying (QPSK) and 16-Quadrature Amplitude Modulation (16QAM) are supported, whereas a higher category UE supports also (at least) 64QAM.

Apart from the ability to support low-cost Machine-Type Communication (MTC) devices, another driver for the MTC work in LTE Release 13 was the ability to support MTC communication in considerably worse coverage than what has been possible in earlier releases of the LTE specification, which mainly targeted traditional services such as mobile broadband and speech services. The main tool for providing the enhanced coverage is by introducing repetitions of physical signals and channels in order for a receiver to be able to accumulate more energy such that the transmitted signal can be successfully decoded at the receiving end. This mechanism is defined both for the downlink (DL) and uplink (UL). To indicate the support for enhanced coverage, two different modes of operations were introduced: Coverage Enhancement Mode A (CEModeA) intended for low-to-moderate coverage enhancement compared to earlier releases; and Coverage Enhancement Mode B (CEModeB) intended for moderate-to-high coverage enhancement. A Cat-M1 UE is configured in either in CEModeA or CEModeB, but in order to exploit the new coverage enhancement mechanisms also for higher category UEs, it is from Release 13 possible to configure also these devices in CEModeA and CEModeB. These devices will then, in most respects, operate and behave as if they were Cat-M1 devices as long as they are configured in any of these modes. In the 3GPP specification, UEs that are either Cat-M1 UEs or higher category UEs configured in coverage enhancement are often referred to as BL/CE UEs, which can be interpreted as for bandwidth reduced, low complexity, (and/or) coverage enhanced UEs.

As described in 3GPP TS 36.212 "Evolved Universal Terrestrial Radio Access (E-UTRA); Multiplexing and channel coding", V13.2.0 (2016 June) (hereinafter "3GPP TS 36.212") and 3GPP TS 36.211 "Evolved Universal Terrestrial Radio Access (E-UTRA); Physical channels and modulation", V13.2.0 (2016 June) (hereinafter "3GPP TS 36.211"), DL data transmission from a network node (such as an eNodeB) to a Cat-M1 UE is scheduled with downlink control information (DCI) carried over the MTC Physical Downlink Control Channel (MPDCCH). The actual DL data is carried over the Physical Downlink Shared Channel (PDSCH) (as described in 3GPP TS 36.211). Compared to the ordinary Physical Downlink Control Channel (PDCCH), the MPDCCH supports some additional functionality including the possibility to schedule PDSCH with repetition over multiple subframes for improved coverage (as described in 3GPP TS 36.211). The MPDCCH itself can also be repeated over multiple subframes (as described in 3GPP TS 36.211). When PDSCH is scheduled by MPDCCH, the first PDSCH subframe is transmitted 2 subframes later than the last MPDCCH subframe (i.e., there is 1 subframe in between the end of the MPDCCH transmission and the beginning of the associated PDSCH transmission. This is described in 3GPP TS 36.213 "Evolved Universal Terrestrial Radio Access (E-UTRA); Physical layer procedures," V13.2.0 (2016 June) (hereinafter "3GPP TS 36.213").

If repetitions for PDSCH are used, the subsequent subframes are also used. New DCI formats to be used for Cat-M1 UEs were defined. The new DCI formats better suited both the limitations imposed by the restrictions of Cat-M1 UEs as well as the new needs associated with Cat-M1 features compared to UEs of earlier releases and higher categories. Specifically, the DCI format 6-1A is used for scheduling DL transmissions for BL/CE UEs configured in CEModeA, whereas DCI format 6-1B is used for scheduling DL transmissions for BL/CE UEs configured in CEModeB.

In LTE Release 14, a work item on further enhanced MTC (feMTC) introduced some further enhancements for supporting MTC devices. Some new features aimed at increasing the maximum throughput of MTC devices in order to support more use cases where the machine-type communication requires higher (e.g., instantaneous) throughput. To this end, a new UE category was introduced, Cat-M2, which supports a somewhat larger maximum TBS (4,008 bits) and a larger maximum channel bandwidth (24 PRBs) compared to Cat-M1. Furthermore, for higher category UEs, a possibility to use the full system bandwidth when configured in CEModeA, while still supporting only modulation up to 16QAM. The maximum TBS for such a device becomes 27,376 bits when operating in a 20 MHz wide LTE carrier.

For LTE Release 15, a work item on even further enhanced MTC (efeMTC) is currently ongoing. One of the work item objectives is to improve the spectral efficiency of the MTC traffic. The use of only up to 16QAM for Release 13 and 14 was motivated by reduced UE complexity as well as the limited requirements on data throughput for MTC devices. However, a downside of this is that the MTC device uses an unnecessarily large amount of resources for data transmission also when it is in good coverage. As a means to address that, it has been decided to introduce optional support for 64QAM in the DL for BL/CE UEs. By utilizing higher order modulation, the network may schedule an MTC device in good coverage with a certain desired data throughput using fewer PRBs than would be possible if only QPSK or 16QAM modulation was used. Thereby the DL spectral efficiency can be improved.

SUMMARY

According to one example embodiment, a method performed by a network node for indicating a modulation and coding scheme for a wireless device operating in a coverage enhancement mode is provided. The wireless device operates with a first modulation and coding scheme using physical downlink shared channel repetitions and with a second modulation and coding scheme without using physical downlink shared channel repetitions, and wherein the second modulation and coding scheme is a higher order of modulation and coding than the first modulation and coding scheme. The method comprises configuring, when physical downlink shared channel repetitions are not used, the downlink control information to indicate one or more parameters related to the second modulation and coding scheme, the indication comprising at least the modulation and coding scheme field of the first modulation and coding scheme and one or more downlink control information field bits which are used in relation to repetitions when repetitions of a physical downlink shared channel are used.

In another embodiment the method comprises determining whether repetitions are being used for transmissions over a downlink shared channel to a wireless device, the wireless device capable of using, for example, 64-Quadrature Amplitude Modulation (QAM) when configured in a first coverage enhancement mode and configured to use, for example, 64QAM when configured in the first coverage enhancement mode. The method comprises configuring downlink control information (DCI) to indicate one or more parameters related to the modulation scheme, in this example 64QAM, for use by the wireless device if it is determined that no repetitions are being used. In certain embodiments, one or more of the following may apply:

the method may comprise determining whether the wireless device is capable of using 64QAM when configured in the first coverage enhancement mode;
the method may comprise determining whether the wireless device is configured to use 64QAM when configured in the first coverage enhancement mode;
the method may comprise transmitting the DCI to the wireless device;
configuring DCI to indicate one or more parameters related to 64QAM for use by the wireless device may comprise one of:
  using a parameter of the DCI to indicate that the modulation and coding scheme (MCS) index the wireless device should use for determining the modulation format and transport block size (TBS) is given by a 4 bit value of the MCS field; and
  using a parameter of the DCI to indicate that the MCS index the wireless device should use for determining the modulation format and TBS is given by adding 16 to the 4 bit value of the MCS field;
  the parameter may comprise one or more of:
    a frequency hopping flag with a value of one; and
    a DCI subframe repetition number field;
configuring DCI to indicate one or more parameters related to 64QAM for use by the wireless device may comprise using a frequency hopping flag parameter as a most significant bit together with a MCS field to indicate a MCS index;
configuring DCI to indicate one or more parameters related to 64QAM for use by the wireless device may comprise using a frequency hopping flag parameter as a least significant bit together with a MCS field as four most significant bits.

According to another example embodiment, a network node for indicating a modulation and coding scheme for a wireless device operating in a coverage enhancement mode is provided. The wireless device operates with a first modulation and coding scheme using physical downlink shared channel repetitions and with a second modulation and coding scheme without using physical downlink shared channel repetitions, and wherein the second modulation and coding scheme is a higher order of modulation and coding than the first modulation and coding scheme, the network node arranged to configure, when physical downlink shared channel repetitions are not used, the downlink control information to indicate one or more parameters related to the second modulation and coding scheme, the indication comprising at least the modulation and coding scheme field of the first modulation and coding scheme and one or more downlink control information field bits which are used in relation to repetitions when repetitions of a physical downlink shared channel are used.

In another embodiment a network node comprises processing circuitry. The processing circuitry is configured to determine whether repetitions are being used for transmissions over a downlink shared channel to a wireless device, the wireless device capable of using, for example, 64-Quadrature Amplitude Modulation (QAM) when configured in a first coverage enhancement mode and configured to use, for example, 64QAM when configured in the first coverage enhancement mode. The processing circuitry is configured to configure downlink control information (DCI) to indicate one or more parameters related to the modulation scheme, in this example 64QAM, for use by the wireless device if it is determined that no repetitions are being used.

According to another example embodiment, a method performed by a wireless device for determining a modulation and coding scheme for a wireless device for operating in a coverage enhancement mode is provided. A first modulation and coding scheme uses physical downlink shared channel repetitions and a second modulation and coding scheme does not use physical downlink shared channel repetitions, and wherein the second modulation and coding scheme is a higher order of modulation and coding than the first modulation and coding scheme. The method comprises receiving a downlink control information comprising an indication to one or more parameters related to the second modulation and coding scheme when physical downlink shared channel repetitions are not used, the indication comprising at least the modulation and coding scheme field of the first modulation and coding scheme and one or more downlink control information field bits which are used in relation to repetitions when repetitions of a physical downlink shared channel are used.

According to another embodiment another method in a wireless device is disclosed. The method comprises receiving downlink control information (DCI) from a network node, wherein the wireless device is capable of using, for example, 64-Quadrature Amplitude Modulation (64QAM) when configured in a first coverage enhancement mode and configured to use, for example, 64QAM when configured in the first coverage enhancement mode. The method comprises determining, based on the received DCI, a modulation format and transport block size (TBS) for use by the wireless device for, in this example, 64QAM. In certain embodiments, one or more of the following may apply:

determining, based on the received DCI, a modulation format and transport block size (TBS) for use by the wireless device for 64QAM may comprise one of:
  if a frequency hopping flag value of the DCI is zero, determining a modulation and coding scheme (MCS) index to be used for determining the modulation format and TBS based on a 4 bit value of an MCS field; and
  if the frequency hopping flag value of the DCI is one, determining the MCS index to be used for determining the modulation format and TBS by adding 16 to the 4 bit value of the MCS field;
determining, based on the received DCI, a modulation format and TBS for use by the wireless device for 64QAM may comprise one of:
  using a frequency hopping flag as a most significant bit together with an MCS field to determine an MCS index;
  using a frequency hopping flag as a least significant bit and an MCS field as four most significant bits;
determining the modulation format and TBS for use by the wireless device for 64QAM may be further based on one or more criteria;
the one or more criteria may comprise one or more of:
  a category of the wireless device; and
  a configured bandwidth;
determining, based on the received DCI, a modulation format and TBS for use by the wireless device for 64QAM may comprise:
  determining the modulation format and TBS based on one or more of:
    a frequency hopping flag; and
    a DCI subframe repetition number field.

According to another example embodiment, a wireless device is disclosed. The wireless device comprises processing circuitry. The processing circuitry is configured to receive downlink control information (DCI) from a network node, wherein the wireless device is capable of using 64-Quadrature Amplitude Modulation (64QAM) when configured in a first coverage enhancement mode and configured to use 64QAM when configured in the first coverage enhancement mode. The processing circuitry is configured to determine, based on the received DCI, a modulation format and transport block size (TBS) for use by the wireless device for 64QAM.

Additional information about the various embodiments described herein is included in the attached Appendix A.

Certain embodiments of the present disclosure may provide one or more technical advantages. As one example, certain embodiments may advantageously make it possible to schedule a BL/CE UE with 64QAM modulation without increasing the size of the DCI format. In some cases, this is achieved by re-interpreting bits that become redundant when 64QAM can be applied. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
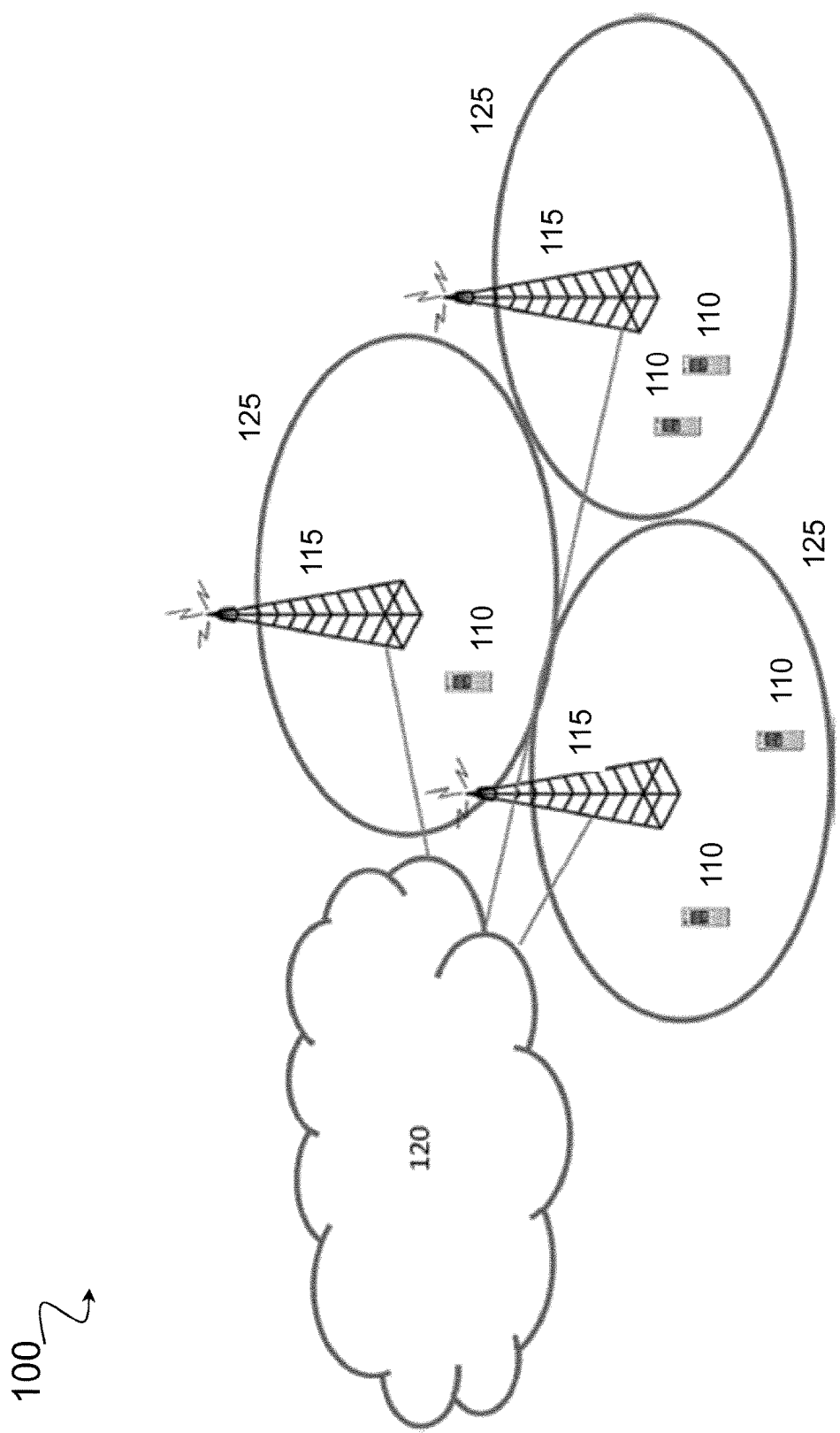
FIG. 1 is a block diagram illustrating an embodiment of a network, in accordance with certain embodiments.

As described above, it has been decided to introduce optional support for 64QAM in the DL for BL/CE UEs. By utilizing higher order modulation, the network may schedule an MTC device in good coverage with a certain desired data throughput using fewer PRBs than would be possible if only QPSK or 16QAM modulation was used, thereby improving the DL spectral efficiency.

It is proposed that this optional support for 64QAM is indicated by capability signaling by the UE. The actual use of the higher order modulation is then proposed to be configured by the network via dedicated Radio Resource Control (RRC) signaling. Since higher order modulation typically is most useful in good coverage only, and at relatively high coding rates, it has been decided that 64QAM is only supported in CEModeA, and only when no repetitions of the data channel PDSCH are being used. The introduction of 64QAM does not intend to increase the maximum TBS compared to Release 14.

As mentioned above, DL transmission for BL/CE UEs is scheduled via signaling using DCI format 6-1A. The coding and modulation scheme for the transmission is determined by an Modulation and Coding Scheme (MCS) field, which serves both to define the modulation format used, and the transport block size (TBS) of the transmission. For DCI formats used by higher UE categories, the MCS field is 5 bits in order to be able to address also the transport block sizes using 64QAM (or higher). In DCI format 6-1A, however, this MCS field consist of only 4 bits, which suffices to indicate all allowed transport block sizes using QPSK and 16QAM, but not 64QAM. Hence, there is need for a solution that changes the existing DCI format 6-1A in way such that enables the use of 64QAM.

One possible approach is to increase the size of the MCS field to 5 bits when higher order modulation is configured for the UE. Such an approach, however, has the drawback of reduced performance of the control channel MPDCCH carrying the DCI format. This is due to the increased code rate. Another alternative approach could be to reinterpret the existing 4 bits of the DCI format such that, for example, only every second entry in the TBS table is used. This, however, has the drawback of significantly reducing the scheduling granularity since not all transport block sizes are available for the scheduler.

The present disclosure contemplates various embodiments that may address these and other deficiencies associated with existing approaches. In certain embodiments, for example, the use of 64QAM modulation is enabled by re-interpreting the existing contents of DCI format 6-1A such that all applicable entries in the TBS table can be addressed for BL/CE UEs. In some cases, this is achieved by re-interpreting bits that become redundant when 64QAM can be applied. One such example is the frequency hopping flag, which until now does not have a meaning when repetitions are not used.

Certain embodiments of the present disclosure may provide one or more technical advantages. As one example, certain embodiments may advantageously make it possible to schedule a BL/CE UE with 64QAM modulation without increasing the size of the DCI format. In some cases, this is achieved by re-interpreting bits that become redundant when 64QAM can be applied. Other advantages may be readily apparent to one having skill in the art. Certain embodiments may have none, some, or all of the recited advantages.

FIG. 1 is a block diagram illustrating an embodiment of a network 100, in accordance with certain embodiments. Network 100 includes one or more UE(s) 110 (which may be interchangeably referred to as wireless devices 110) and one or more network node(s) 115 (which may be interchangeably referred to as eNBs 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, BL UE, BL/CE UE, Cat-M1 UE, Cat-M2 UE, D2D UE, MTC UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. For example, UE 110 may operate in one or more of CEModeA, CEModeB, or other suitable coverage enhancement modes. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station, Node B, multi-standard radio (MSR) radio node such as MSR BS, evolved Node B (eNB), gNB, network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 5-9.

Although FIG. 1 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, 5G, Narrowband Internet-of-Things (NB-IOT), UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the DL, the present disclosure contemplates that the various embodiments are equally applicable in the UL.

As described above, the DCI format 6-1A is used for scheduling DL transmissions for BL/CE UEs. This is defined in 3GPP TS 36.212 in part as shown below:

5.3.3.1.12 Format 6-1A

DCI format 6-1A is used for the compact scheduling of one PDSCH codeword in one cell, random access procedure initiated by a PDCCH order, and notifying SC-MCCH change. The DCI corresponding to a PDCCH order can be carried by MPDCCH.

The following information is transmitted by means of the DCI format 6-1A:

Flag format 6-0A/format 6-1A differentiation—1 bit, where value 0 indicates format 6-0A and value 1 indicates format 6-1A Format 6-1A is used for random access procedure initiated by a PDCCH order only if format 6-1A CRC is scrambled with C-RNTI and all the remaining fields are set as follows:

[ . . . ]

Otherwise,

Frequency hopping flag—1 bit, where value 0 indicates frequency hopping is not enabled and value 1 indicates frequency hopping is enabled as defined in section 6.4.1 of [2]

Resource block assignment flag—1 bit. This field is only present when the higher layer parameter ce-pdsch-maxBandwidth-config is configured and set to 20 MHz.

Resource block assignment—

[ . . . ]

Modulation and coding scheme—4 bits as defined in section 7.1.7 of [3]

Repetition number—2 bits as defined in section 7.1.11 of [3]

[ . . . ]

DCI subframe repetition number—0 or 2 bits as defined in section 9.1.5 of [3] (this field is 0 bits if Transport blocks in a bundle is present)

[ . . . ]

As can be seen from the excerpt above, it is possible to have conditional interpretation of the DCI format. In this case, it is exemplified for the Resource Block (RB) assignment flag, which is only present if the UE has been configured via RRC signaling with the parameter ce-pdsch-maxBandwidth-config (and if this is set to 20 MHz).

The 4 bits indicating MCS is used for an MTC device to determine the modulation format and TBS. Different variants exist for how this is done, but the main procedure is described herein. First, the modulation order is determined by using Table 7.1.7.1-1 in 3GPP TS 36.213 (reproduced below). The four bits are interpreted as a binary number 0-15, and the corresponding MCS index row is used to determine the modulation order Qm, where Qm=2, 4, and 6 correspond to QPSK, 16QAM and 64QAM, respectively.

TABLE 7.1.7.1-1

Modulation and TBS index table for PDSCH

| MCS Index $I_{MCS}$ | Modulation Order $Q_m$ | Modulation Order $Q_m$ | TBS Index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A |
| 29 | 2 | 2 | reserved |
| 30 | 4 | 4 | |
| 31 | 6 | 6 | |

Since only rows 0-15 can be addressed, only Qm=2 or Qm=4 can be used. The MCS index is also used to determine the TBS index, which is incremented by one for each MCS index, except where the modulation order is incremented. Once the TBS index has been determined, Table 7.1.7.2.1-1 in 3GPP TS 36.213 (reproduced in part below) is used to determine the TBS.

TABLE 7.1.7.2.1-1

Transport block size table (dimension 38 × 110)

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |

TABLE 7.1.7.2.1-1-continued

Transport block size table (dimension 38 × 110)

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 806 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

In Table 7.1.7.2.1-1 above, the entry N_PRB refers to the number of PRBs allocated for the transmission, which is determined from the Resource Block Assignment field in the DCI.

A possible approach to support 64QAM would be to have the MCS field conditionally contain 5 bits instead of 4 if the use of 64QAM has been configured for the UE. As described above, however, such an approach has certain disadvantages. For example, such an approach has the drawback of reduced performance of the control channel MPDCCH carrying the DCI format. This is due to the increased DCI size and, consequently, the increased code rate. Another possible approach could be to reinterpret the existing 4 bits of the DCI format such that, for example, only every second entry in the TBS table is used. As described above, however, such an approach has certain disadvantages. For example, such an approach has the drawback of significantly reducing the scheduling granularity. This is because not all transport block sizes are available for the scheduler.

The present disclosure contemplates various embodiments that may advantageously enable support for 64QAM while avoiding the disadvantages associated with existing approaches. In certain embodiments, the whole MCS/TBS tables may advantageously be addressed by re-interpreting bits that become redundant when 64QAM can be applied. As described above, 64QAM is intended to be used in relation to repetitions when the PDSCH transmissions do not use repetition over several subframes. The number of PDSCH repetitions is indicated in the DCI by the field Repetition number. When this field indicates that the PDSCH transmission only uses one (1) subframe (i.e., no repetitions), at least the frequency hopping flag becomes redundant. The frequency hopping flag is used to indicate that different PRBs are used for different subframes when PDSCH repetition is used, and frequency hopping is enabled.

Figure 2:
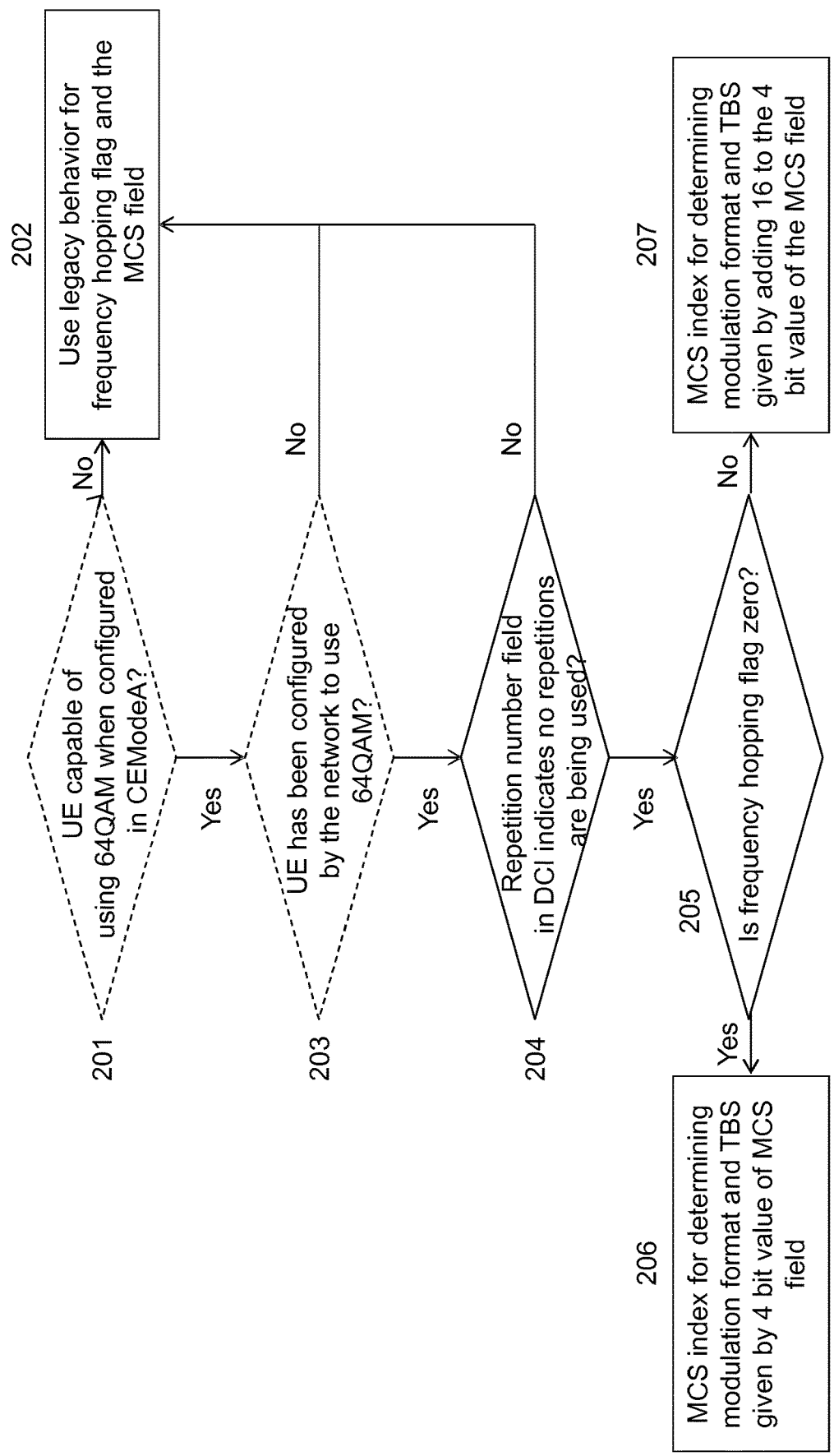
FIG. 2 illustrates a flow diagram of an example method for determining the modulation format and transport block size, in accordance with certain embodiments.

FIG. 2 illustrates a flow diagram of an example method for determining the modulation format and transport block size, in accordance with certain embodiments. In certain embodiments, some or all of the steps may be performed by a UE (e.g., a wireless device). In certain embodiments, some or all the steps may be performed by a network node (e.g., an eNodeB). In certain embodiments, some of the steps may be performed by a UE and some of the steps may be performed by a network node.

In certain embodiments, at step 201, it is determined whether the UE is capable of using 64QAM when configured in CEModeA. If at step 201 it is determined that the UE is not capable of using 64QAM when configured in CEModeA, the method proceeds to step 202, where legacy behavior for frequency hopping flag and the MCS field is used. If, however, at step 201 it is determined that the UE is capable of using 64QAM when configured in CEModeA, the method proceeds to step 203.

In certain embodiments, at step 203, it is determined whether the UE has been configured by the network to use 64QAM when configured in CEModeA. If at step 203 it is determined that the UE is not configured by the network to use 64QAM when configured in CEModeA, the method proceeds to step 202, where legacy behavior for frequency hopping flag and the MCS field is used. If, however, at step 203 it is determined that the UE is configured by the network to use 64QAM when configured in CEModeA, the method proceeds to step 204.

At step 204, it is determined whether the Repetition number field in the DCI indicates that the repetition factor is 1 (i.e., that no repetitions are being used). If at step 204 it is determined that the Repetition number field in the DCI indicates that the repetition factor is not 1, the method proceeds to step 202, where legacy behavior for frequency hopping flag and the MCS field is used. If, however, at step 204 the Repetition number field in the DCI indicates that the repetition factor is 1, the method proceeds to step 205.

At step 205, it is determined whether the frequency hopping flag is zero. If at step 205 it is determined that the frequency hopping flag is zero, the method proceeds to step 206, where the MCS index used for determining modulation format and TBS is the 4 bit value of the MCS field. If, however, at step 205 it is determined that the frequency hopping flag is not zero (e.g., if the frequency hopping flag is one), the method proceeds to step 207 where the MCS index used for determining modulation format and TBS is given by adding 16 to the 4 bit value of the MCS field.

In certain embodiments, step 205 may be formulated in a different way. For example, another way of formulating step 205 is that the frequency hopping flag may be used as the most significant bit (MSB) together with the MCS field to determine the MCS index.

Although certain embodiments may describe the frequency hopping flag as being used as a MSB, the use of the frequency hopping flag as a MSB as described herein is intended as a non-limiting example. The present disclosure contemplates that the frequency hopping flag may, in certain embodiments, be used also as the least significant bit (LSB) and the MCS field as the four MSB. Alternatively, in certain embodiments the five bits may be rearranged in any other possible way.

In other embodiments, the frequency hopping flag may be interpreted differently. For example, according to one example embodiment the frequency hopping flag may be used to signal "64 QAM used," and there may be a reinterpretation of the MCS field when this occurs. This reinterpretation may, for example, include a shift of rows in the MCS/TBS tables, or selection of one or more subsets. In certain embodiments, the selection of subsets may differ between different columns in the TBS table, which correspond to different number of allocated resource blocks.

In addition to the determination of modulation format and TBS as described above, in certain embodiments additional rules or conditions may be applied. For example, there may be an upper limit to what TBS is applicable depending on one or more criteria (e.g., UE category, the configured bandwidth, or any other suitable criteria). Thus, even if the DCI signaling indicates a certain TBS to be used, this is reduced by other conditions.

In certain embodiments, other bits than the frequency hopping flag can be used for this purpose. For example, since the 64QAM is intended to be used in relation to repetitions without PDSCH repetitions, it may be assumed that MPDCCH repetitions are not used either. Since the applied number of MPDCCH repetitions is indicated by the DCI subframe repetition number field, in alternative embodiments this field is used instead. In some embodiments, both the frequency hopping flag and the DCI subframe repetition number field may be used.

In certain embodiments, the activation of the 64QAM support is not conditioned on the number of PDSCH repetitions being set to 1 but, alternatively or additionally, on the number of MPDCCH transmissions.

Figure 3:
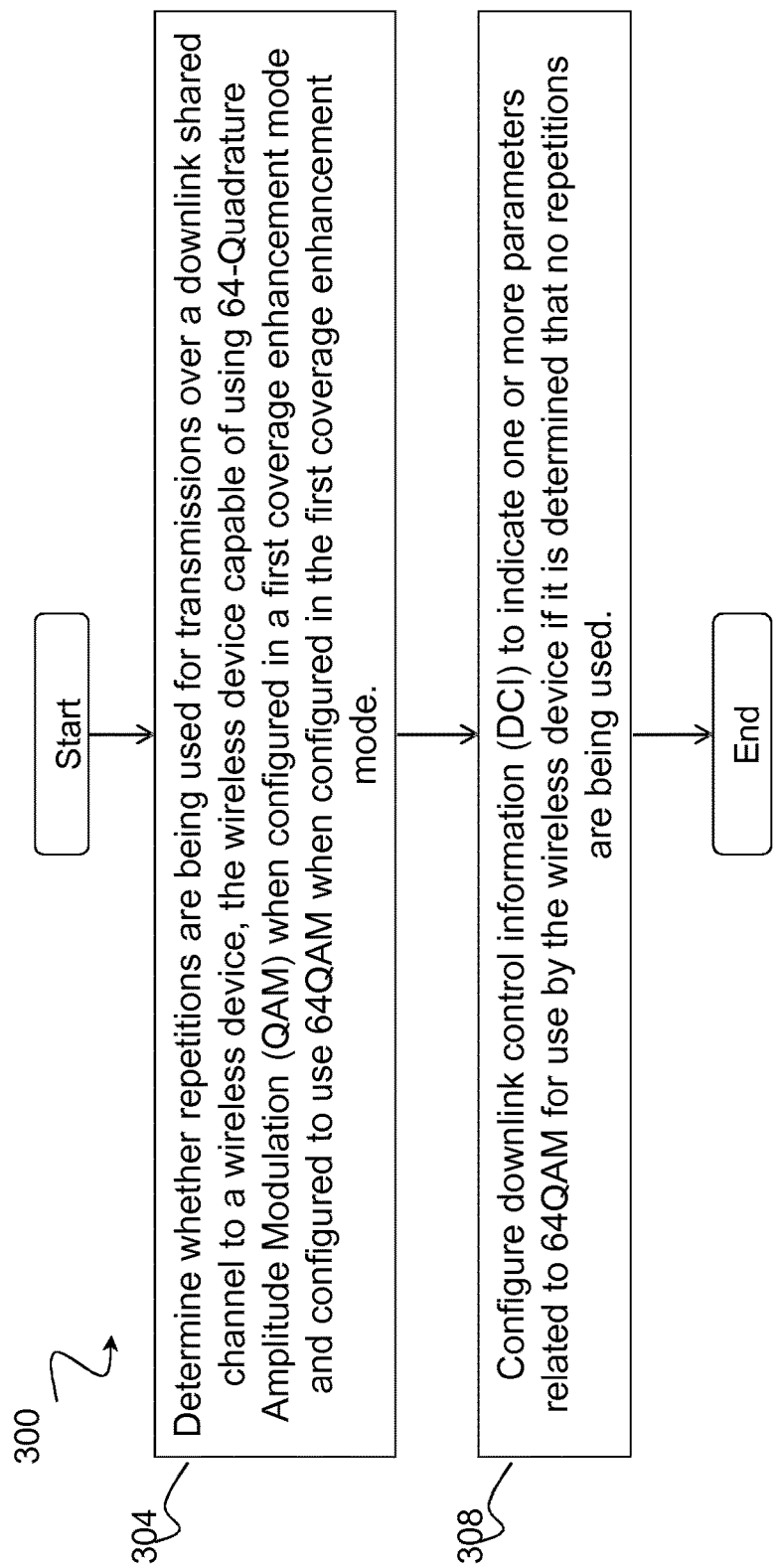
FIG. 3 is a method in a network node, in accordance with certain embodiments.

FIG. 3 is a flow diagram of a method 300 in a network node, in accordance with certain embodiments. Method 300 begins at step 304, where the network node determines whether repetitions are being used for transmissions over a DL shared channel to a wireless device, the wireless device capable of using 64-Quadrature Amplitude Modulation (QAM) when configured in a first coverage enhancement mode and configured to use 64QAM when configured in the first coverage enhancement mode. In certain embodiments, the method may comprise determining whether the wireless device is capable of using 64QAM when configured in the first coverage enhancement mode. In certain embodiments, the method may comprise determining whether the wireless device is configured to use 64QAM when configured in the first coverage enhancement mode.

At step 308, the network node configures DCI to indicate one or more parameters related to 64QAM for use by the wireless device if it is determined that no repetitions are being used. In certain embodiments, the method may comprise transmitting the DCI to the wireless device.

In certain embodiments, configuring DCI to indicate one or more parameters related to 64QAM for use by the wireless device may comprise one of: using a parameter of the DCI to indicate that the modulation and coding scheme (MCS) index the wireless device should use for determining the modulation format and transport block size (TBS) is given by a 4 bit value of the MCS field; and using a parameter of the DCI to indicate that the MCS index the wireless device should use for determining the modulation format and TBS is given by adding 16 to the 4 bit value of the MCS field. In certain embodiments, the parameter may comprise one or more of: a frequency hopping flag with a value of zero; and a DCI subframe repetition number field.

In certain embodiments, configuring DCI to indicate one or more parameters related to 64QAM for use by the wireless device may comprise using a frequency hopping flag parameter as a most significant bit together with a MCS field to indicate a MCS index. In certain embodiments, configuring DCI to indicate one or more parameters related to 64QAM for use by the wireless device may comprise using a frequency hopping flag parameter as a least significant bit together with a MCS field as four most significant bits.

Figure 4:
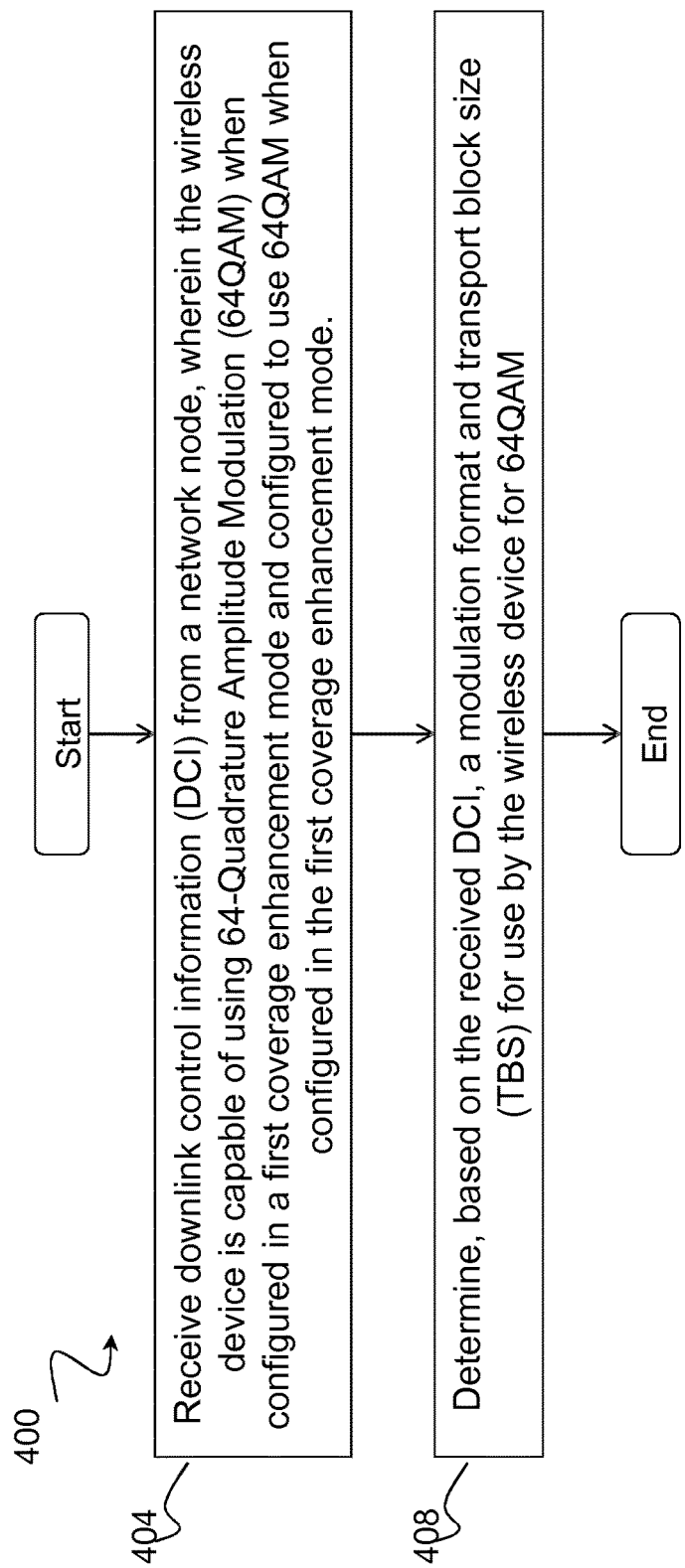
FIG. 4 is a method in a wireless device, in accordance with certain embodiments.

FIG. 4 is a flow diagram of a method 400 in a wireless device, in accordance with certain embodiments. Method 400 begins at step 404, where the wireless device receives DCI from a network node. The wireless device may be capable of using 64QAM when configured in a first coverage enhancement mode and configured to use 64QAM when configured in the first coverage enhancement mode.

At step 408, the wireless device determines, based on the received DCI, a modulation format and TBS for use by the wireless device for 64QAM. In certain embodiments, determining, based on the received DCI, a modulation format and TBS for use by the wireless device for 64QAM may comprise one of: if a frequency hopping flag value of the DCI is zero, determining a modulation and coding scheme (MCS) index to be used for determining the modulation format and TBS based on a 4 bit value of an MCS field; and if the frequency hopping flag value of the DCI is one, determining the MCS index to be used for determining the modulation format and TBS by adding 16 to the 4 bit value of the MCS field.

In certain embodiments, determining, based on the received DCI, a modulation format and TBS for use by the wireless device for 64QAM may comprise one of: using a frequency hopping flag as a most significant bit together with an MCS field to determine an MCS index; and using a frequency hopping flag as a least significant bit and an MCS field as four most significant bits. In certain embodiments, determining the modulation format and TBS for use by the wireless device for 64QAM may be further based on one or more criteria. In some cases, the one or more criteria may comprise one or more of: a category of the wireless device; and a configured bandwidth.

In certain embodiments, determining, based on the received DCI, a modulation format and TBS for use by the wireless device for 64QAM may comprise: determining the modulation format and TBS based on one or more of: a frequency hopping flag; and a DCI subframe repetition number field.

Figure 5:
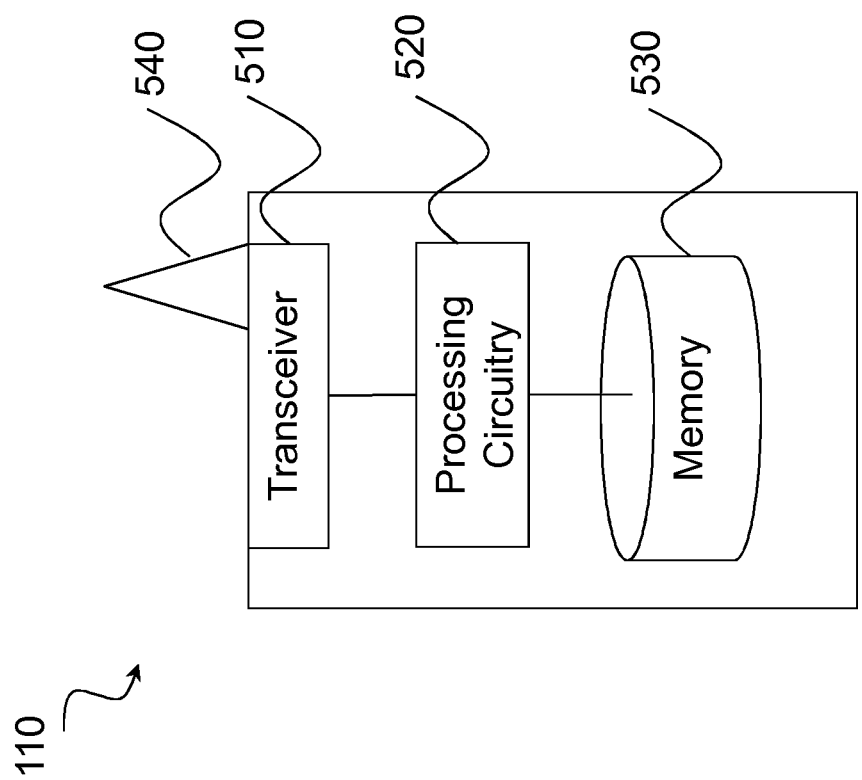
FIG. 5 is a block schematic of an exemplary wireless device, in accordance with certain embodiments.

FIG. 5 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, a BL UE, a BL/CE UE, a Cat-M1 UE, a Cat-M2, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 510, processing circuitry 520, and memory 530. In some embodiments, transceiver 510 facilitates transmitting wireless signals to and receiving wireless signals from network node 115 (e.g., via antenna 540), processing circuitry 520 executes instructions to provide some or all of the functionality described above as being provided by wireless device 110, and memory 530 stores the instructions executed by processing circuitry 520.

Processing circuitry 520 may include any suitable combination of hardware and software implemented in one or more modules to execute instructions and manipulate data to perform some or all of the described functions of wireless device 110, such as the functions of wireless device 110 described above in relation to FIGS. 1-4. In some embodiments, processing circuitry 520 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 530 is generally operable to store instructions, such as a computer program, software, an application including one or more of logic, rules, algorithms, code, tables, etc. and/or other instructions capable of being executed by processing circuitry 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 520.

Other embodiments of wireless device 110 may include additional components beyond those shown in FIG. 5 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 520. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 6:
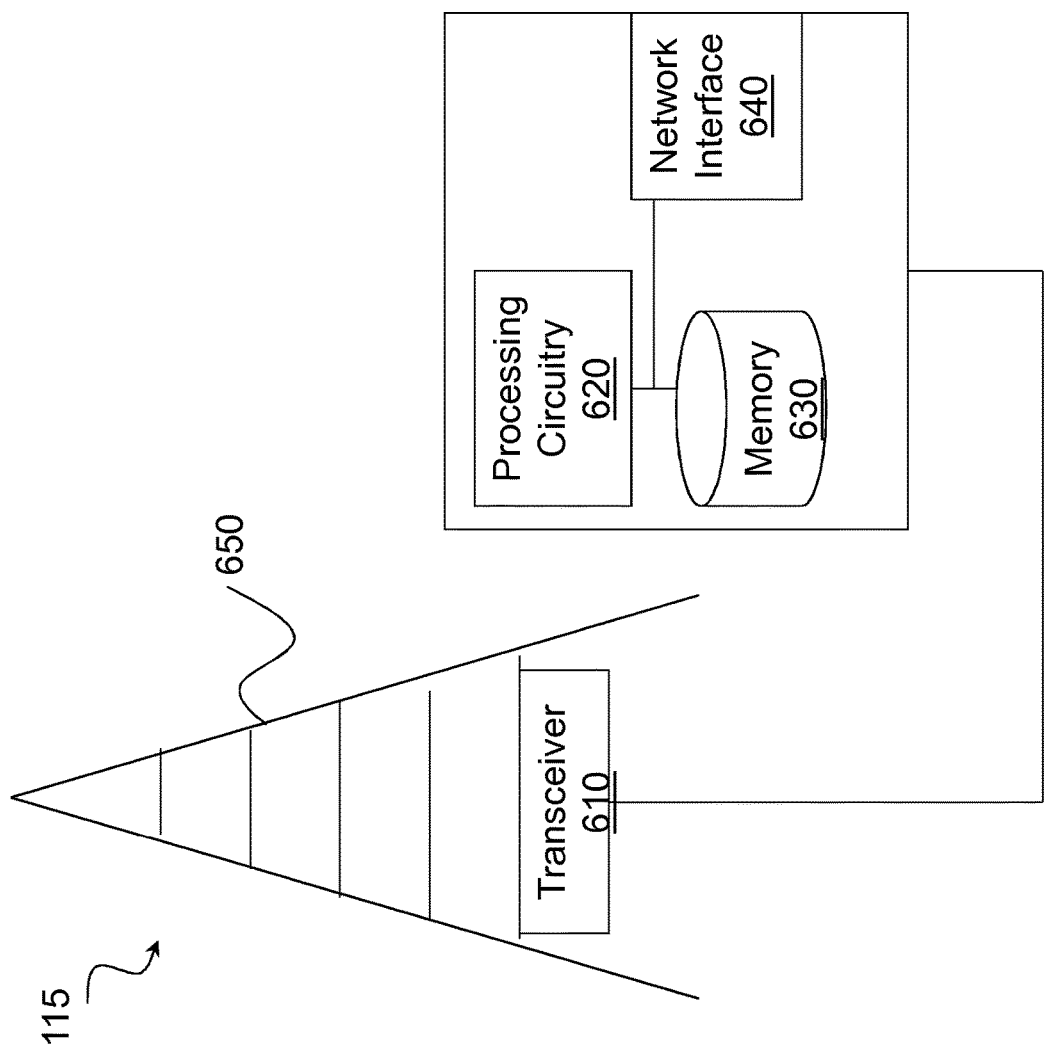
FIG. 6 is a block schematic of an exemplary network node, in accordance with certain embodiments.

FIG. 6 is a block schematic of an exemplary network node 115, in accordance with certain embodiments. Network node 115 may be any type of radio network node or any network node that communicates with a UE and/or with another network node. Examples of network node 115 include an eNodeB, a gNB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 610, processing circuitry 620, memory 630, and network interface 640. In some embodiments, transceiver 610 facilitates transmitting wireless signals to and receiving wireless signals from wireless device 110 (e.g., via antenna 2350), processing circuitry 620 executes instructions to provide some or all of the functionality described above as being provided by a network node 115, memory 630 stores the instructions executed by processing circuitry 620, and network interface 640 communicates signals to backend network components, such as a gateway, switch, router, Internet, Public Switched Telephone Network (PSTN), core network nodes or radio network controllers 130, etc.

Processing circuitry 620 may include any suitable combination of hardware and software implemented in one or more modules to execute instructions and manipulate data to perform some or all of the described functions of network node 115, such as those described above in relation to FIGS. 1-4. In some embodiments, processing circuitry 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by processing circuitry 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processing circuitry 620 and may refer to any suitable device operable to receive input for network node 115, send output from network node 115, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of network node 115 may include additional components beyond those shown in FIG. 6 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 7:
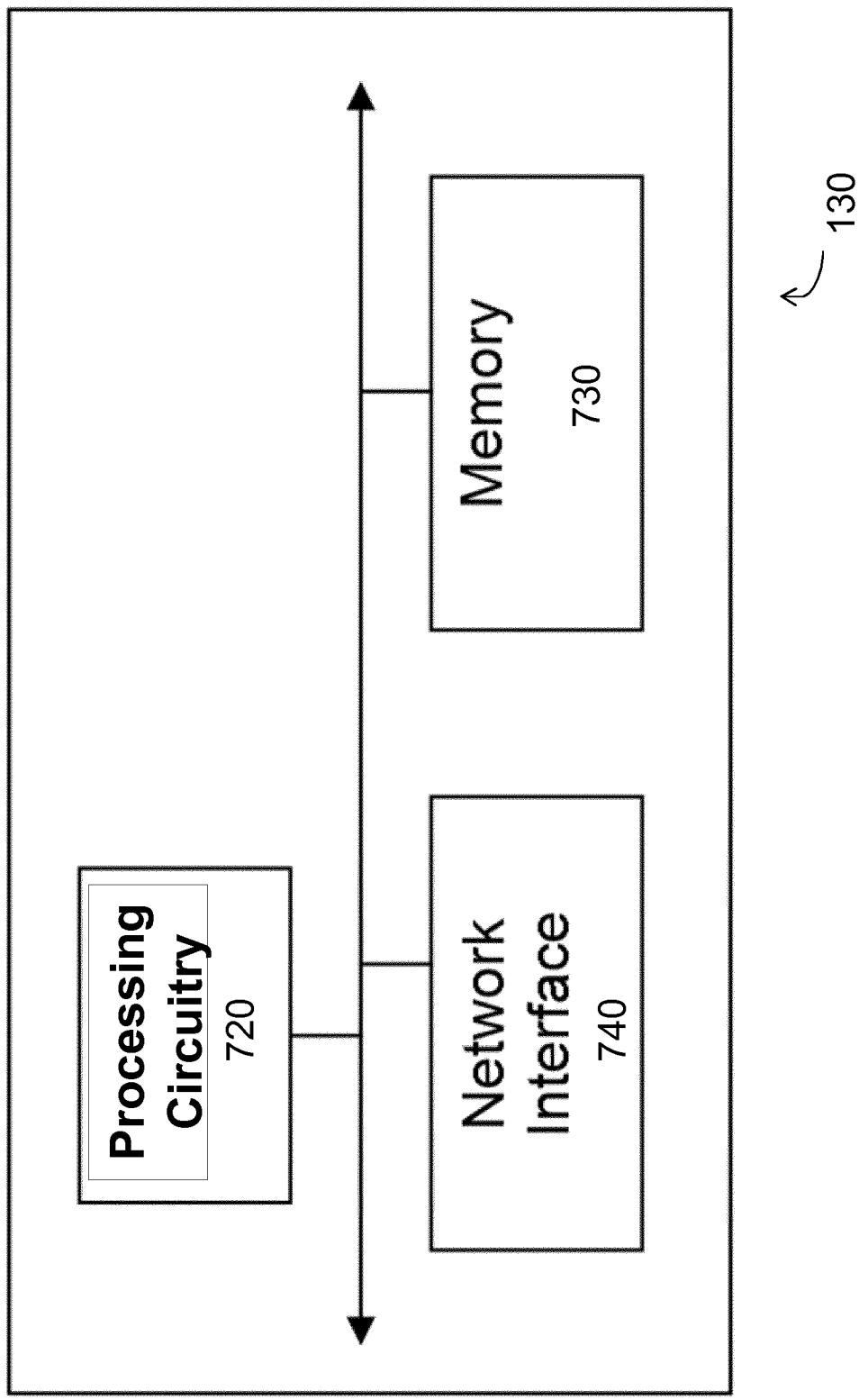
FIG. 7 is a block schematic of an exemplary radio network controller or core network node, in accordance with certain embodiments.

FIG. 7 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 720, memory 730, and network interface 740. In some embodiments, processing circuitry 720 executes instructions to provide some or all of the functionality described above as being provided by the network node, memory 730 stores the instructions executed by processing circuitry 720, and network interface 740 communicates signals to any suitable node, such as a gateway, switch, router, Internet, Public Switched Telephone Network (PSTN), network nodes 115, radio network controllers or core network nodes 130, etc.

Processing circuitry 720 may include any suitable combination of hardware and software implemented in one or more modules to execute instructions and manipulate data to perform some or all of the described functions of the radio network controller or core network node 130. In some embodiments, processing circuitry 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by processing circuitry 720. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processing circuitry 720 and may refer to any suitable device operable to receive input for the network node, send output from the network node, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of the network node may include additional components beyond those shown in FIG. 7 that may be responsible for providing certain aspects of the network node's functionality, including any of the functionality described above and/or any additional functionality (including any functionality necessary to support the solution described above).

Figure 8:
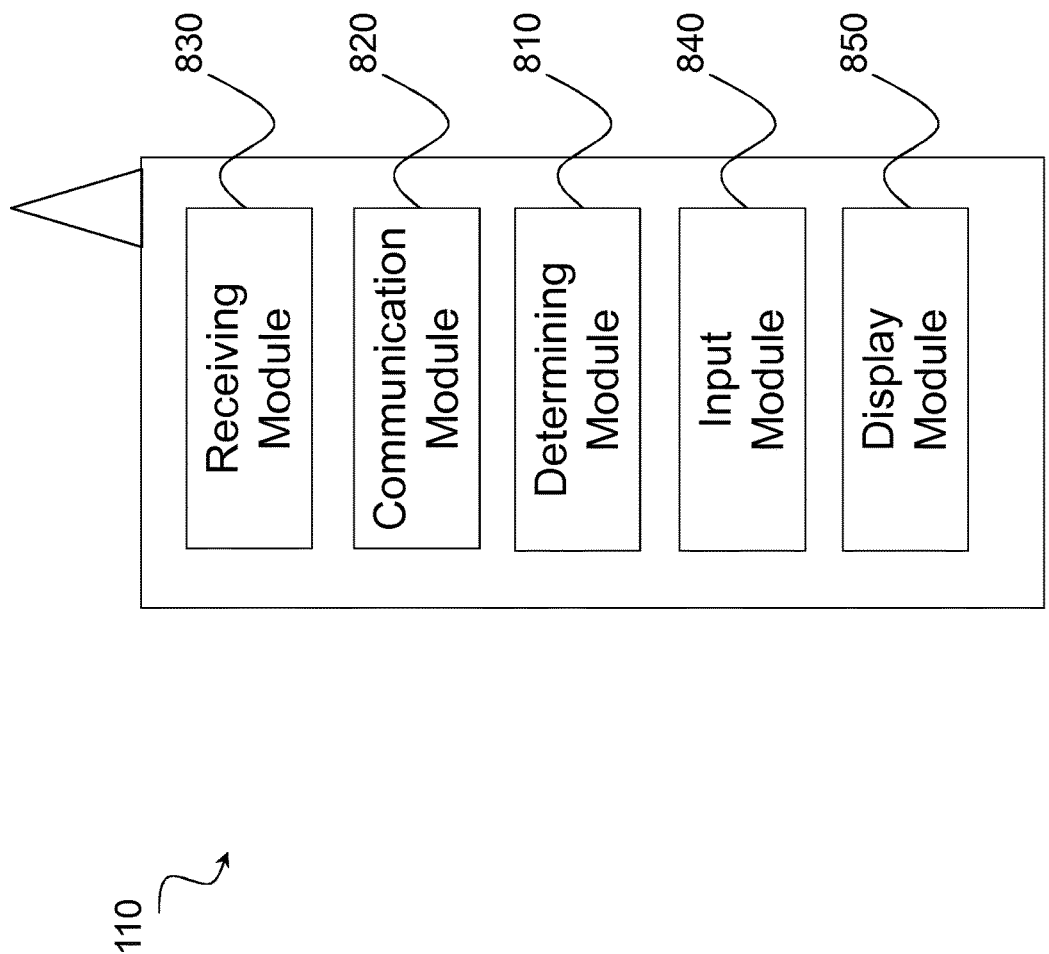
FIG. 8 is a block schematic of an exemplary wireless device, in accordance with certain embodiments.

FIG. 8 is a schematic block diagram of an exemplary wireless device, in accordance with certain embodiments. Wireless device 110 may include one or more modules. For example, wireless device 110 may include a determining module 810, a communication module 820, a receiving module 830, an input module 840, a display module 850, and any other suitable modules. In some embodiments, one or more of determining module 810, communication module 820, receiving module 830, input module 840, display module 850, or any other suitable module may be implemented using one or more processors, such as processing circuitry 520 described above in relation to FIG. 5. In certain embodiments, the functions of two or more of the various modules may be combined into a single module. Wireless device 110 may perform the methods for MCS indication for eMTC devices supporting 64QAM described above in relation to FIGS. 1-4.

Determining module 810 may perform the processing functions of wireless device 110. For example, determining module 810 may determine, based on the received DCI, a modulation format and transport block size (TBS) for use by the wireless device for 64QAM. As another example, determining module 810 may, if a frequency hopping flag value of the DCI is zero, determine a modulation and coding scheme (MCS) index to be used for determining the modulation format and TBS based on a 4 bit value of an MCS field. As yet another example, determining module 810 may, if the frequency hopping flag value of the DCI is one, determining the MCS index to be used for determining the modulation format and TBS by adding 16 to the 4 bit value of the MCS field. As still another example, determining module 810 may use a frequency hopping flag as a most significant bit together with an MCS field to determine an MCS index. As another example, determining module 810 may use a frequency hopping flag as a least significant bit and an MCS field as four most significant bits. Determining module 810 may include or be included in one or more processors, such as processing circuitry 520 described above in relation to FIG. 5. Determining module 810 may include analog and/or digital circuitry configured to perform any of the functions of determining module 810 and/or processing circuitry 520 described above. The functions of determining module 810 described above may, in certain embodiments, be performed in one or more distinct modules.

Communication module 820 may perform the transmission functions of wireless device 110. Communication module 820 may include a transmitter and/or a transceiver, such as transceiver 510 described above in relation to FIG. 5. Communication module 820 may include circuitry configured to wirelessly transmit messages and/or signals. In particular embodiments, communication module 820 may receive messages and/or signals for transmission from determining module 810. In certain embodiments, the functions of communication module 820 described above may be performed in one or more distinct modules.

Receiving module 830 may perform the receiving functions of wireless device 110. For example, receiving module 830 may receive DCI from a network node. Receiving module 830 may include a receiver and/or a transceiver. Receiving module 830 may include a receiver and/or a transceiver, such as transceiver 510 described above in relation to FIG. 5. Receiving module 830 may include circuitry configured to wirelessly receive messages and/or signals. In particular embodiments, receiving module 830 may communicate received messages and/or signals to determining module 810. The functions of receiving module 830 described above may, in certain embodiments, be performed in one or more distinct modules.

Input module 840 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 810. The functions of input module 840 described above may, in certain embodiments, be performed in one or more distinct modules.

Display module 850 may present signals on a display of wireless device 110. Display module 850 may include the display and/or any appropriate circuitry and hardware configured to present signals on the display. Display module 850 may receive signals to present on the display from determining module 810. The functions of display module 850 described above may, in certain embodiments, be performed in one or more distinct modules.

Determining module 810, communication module 820, receiving module 830, input module 840, and display module 850 may include any suitable configuration of hardware and/or software. Wireless device 110 may include additional modules beyond those shown in FIG. 8 that may be responsible for providing any suitable functionality, including any of the functionality described above and/or any additional functionality (including any functionality necessary to support the various solutions described herein).

Figure 9:
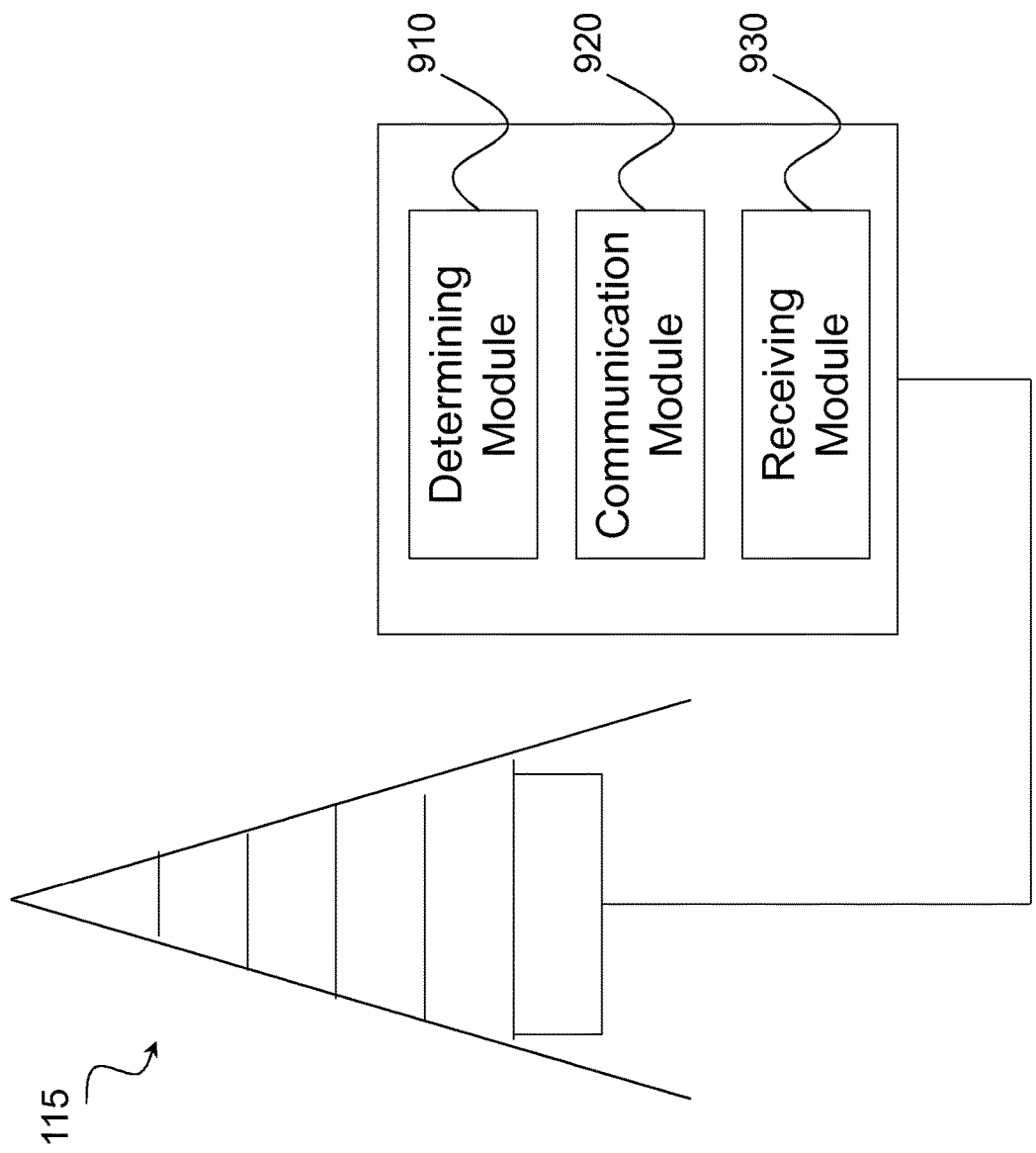
FIG. 9 is a block schematic of an exemplary network node, in accordance with certain embodiments.

FIG. 9 is a schematic block diagram of an exemplary network node 115, in accordance with certain embodiments. Network node 115 may include one or more modules. For example, network node 115 may include determining module 910, communication module 920, receiving module 930, and any other suitable modules. In some embodiments, one or more of determining module 910, communication module 920, receiving module 930, or any other suitable module may be implemented using one or more processors, such as processing circuitry 620 described above in relation to FIG. 6. In certain embodiments, the functions of two or more of the various modules may be combined into a single module. Network node 115 may perform the methods for MCS indication for eMTC devices supporting 64QAM described above with respect to FIGS. 1-4.

Determining module 910 may perform the processing functions of network node 115. As an example, determining module 910 may determine whether repetitions are being used for transmissions over a DL shared channel to a wireless device, the wireless device capable of using 64-Quadrature Amplitude Modulation (QAM) when configured in a first coverage enhancement mode and configured to use 64QAM when configured in the first coverage enhancement mode. As another example, determining module 910 may determine whether the wireless device is capable of using 64QAM when configured in the first coverage enhancement mode. As still another example, determining module 910 may determine whether the wireless device is configured to use 64QAM when configured in the first coverage enhancement mode. As yet another example, determining module 910 may configure DCI to indicate one or more parameters related to 64QAM for use by the wireless device if it is determined that no repetitions are being used.

Determining module 910 may include or be included in one or more processors, such as processing circuitry 620 described above in relation to FIG. 6. Determining module 910 may include analog and/or digital circuitry configured to perform any of the functions of determining module 910 and/or processing circuitry 620 described above. The functions of determining module 910 may, in certain embodiments, be performed in one or more distinct modules.

Communication module 920 may perform the transmission functions of network node 115. As one example, communication module 920 may transmit the DCI to the wireless device. Communication module 920 may transmit messages to one or more of wireless devices 110. Communication module 920 may include a transmitter and/or a transceiver, such as transceiver 610 described above in relation to FIG. 6. Communication module 920 may include circuitry configured to wirelessly transmit messages and/or signals. In particular embodiments, communication module 920 may receive messages and/or signals for transmission from determining module 910 or any other module. The functions of communication module 920 may, in certain embodiments, be performed in one or more distinct modules.

Receiving module 930 may perform the receiving functions of network node 115. Receiving module 930 may receive any suitable information from a wireless device. Receiving module 930 may include a receiver and/or a transceiver, such as transceiver 610 described above in relation to FIG. 6. Receiving module 930 may include circuitry configured to wirelessly receive messages and/or signals. In particular embodiments, receiving module 930 may communicate received messages and/or signals to determining module 910 or any other suitable module. The functions of receiving module 930 may, in certain embodiments, be performed in one or more distinct modules.

Determining module 910, communication module 920, and receiving module 930 may include any suitable configuration of hardware and/or software. Network node 115 may include additional modules beyond those shown in FIG. 9 that may be responsible for providing any suitable functionality, including any of the functionality described above and/or any additional functionality (including any functionality necessary to support the various solutions described herein).

Figure 10:
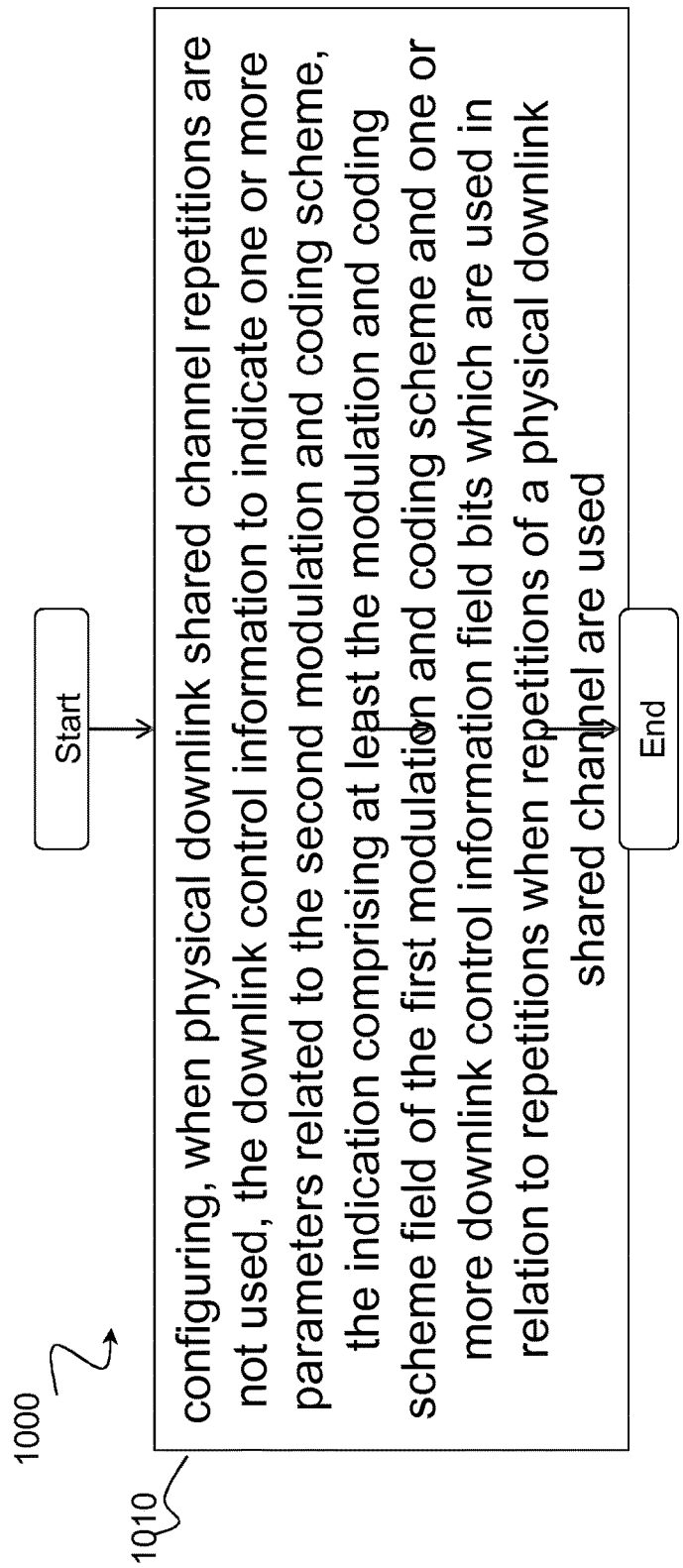
FIG. 10 is a method in a network node, in accordance with certain embodiments.

FIG. 10 provides an example method 1000 in a network node, for example an eNodeB. The method 1000 performed by a network node for indicating a modulation and coding scheme for a wireless device operating in a coverage enhancement mode, wherein the wireless device operates with a first modulation and coding scheme using physical downlink shared channel repetitions and with a second modulation and coding scheme without using physical downlink shared channel repetitions, and wherein the second modulation and coding scheme is a higher order of modulation and coding than the first modulation and coding scheme, the method comprises the step 1010 of the network node configuring, when physical downlink shared channel repetitions are not used, the downlink control information to indicate one or more parameters related to the second modulation and coding scheme, the indication comprising at least the modulation and coding scheme field of the first modulation and coding scheme and one or more downlink control information field bits which are used in relation to repetitions when repetitions of a physical downlink shared channel are used.

Figure 11:
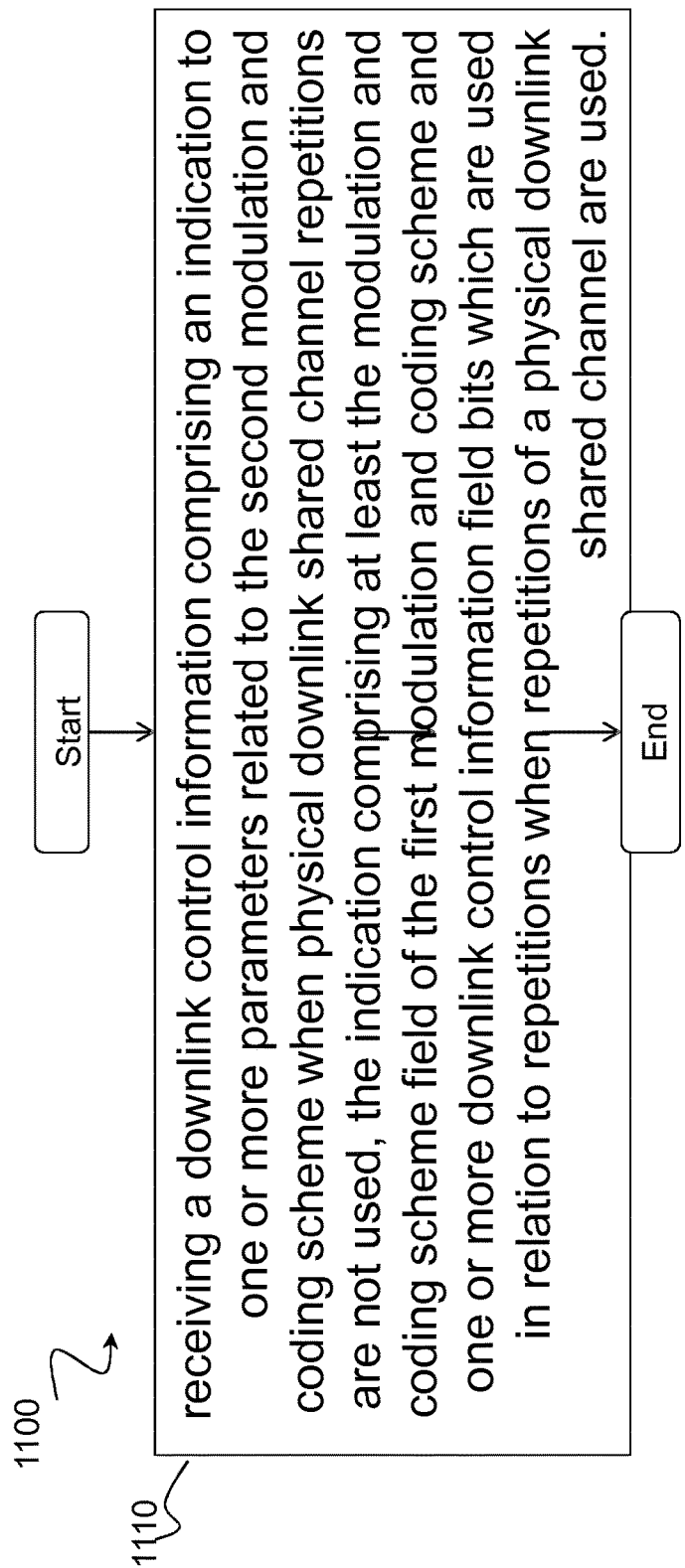
FIG. 11 is a method in a wireless device, in accordance with certain embodiments.

FIG. 11 provides an example method 1100 in a wireless device, for example a UE. The method 1100 is performed by a wireless device for determining a modulation and coding scheme for a wireless device for operating in a coverage enhancement mode, wherein a first modulation and coding scheme uses physical downlink shared channel repetitions and a second modulation and coding scheme does not use physical downlink shared channel repetitions, and wherein the second modulation and coding scheme is a higher order of modulation and coding than the first modulation and coding scheme, the method comprises the step 1110 of the wireless device receiving a downlink control information comprising an indication to one or more parameters related to the second modulation and coding scheme when physical downlink shared channel repetitions are not used, the indication comprising at least the modulation and coding scheme field of the first modulation and coding scheme and one or more downlink control information field bits which are used in relation to repetitions when repetitions of a physical downlink shared channel are used.

Summary of Example Embodiments

According to one example embodiment, a method in a network node is disclosed. The method comprises determining whether repetitions are being used for transmissions over a downlink shared channel to a wireless device, the wireless device capable of using 64-Quadrature Amplitude Modulation (QAM) when configured in a first coverage enhancement mode and configured to use 64QAM when configured in the first coverage enhancement mode. The method comprises configuring downlink control information (DCI) to indicate one or more parameters related to 64QAM for use by the wireless device if it is determined that no repetitions are being used. In certain embodiments, one or more of the following may apply:
the method may comprise determining whether the wireless device is capable of using 64QAM when configured in the first coverage enhancement mode;
the method may comprise determining whether the wireless device is configured to use 64QAM when configured in the first coverage enhancement mode;
the method may comprise transmitting the DCI to the wireless device;
configuring DCI to indicate one or more parameters related to 64QAM for use by the wireless device may comprise one of:
using a parameter of the DCI to indicate that the modulation and coding scheme (MCS) index the wireless device should use for determining the modulation format and transport block size (TBS) is given by a 4 bit value of the MCS field; and
using a parameter of the DCI to indicate that the MCS index the wireless device should use for determining the modulation format and TBS is given by adding 16 to the 4 bit value of the MCS field;
the parameter may comprise one or more of:
a frequency hopping flag with a value of one; and
a DCI subframe repetition number field;
configuring DCI to indicate one or more parameters related to 64QAM for use by the wireless device may comprise using a frequency hopping flag parameter as a most significant bit together with a MCS field to indicate a MCS index;
configuring DCI to indicate one or more parameters related to 64QAM for use by the wireless device may comprise using a frequency hopping flag parameter as a least significant bit together with a MCS field as four most significant bits.
According to another example embodiment, a network node is disclosed. The network node comprises processing circuitry. The processing circuitry is configured to determine whether repetitions are being used for transmissions over a downlink shared channel to a wireless device, the wireless device capable of using 64-Quadrature Amplitude Modulation (QAM) when configured in a first coverage enhancement mode and configured to use 64QAM when configured in the first coverage enhancement mode. The processing circuitry is configured to configure downlink control information (DCI) to indicate one or more parameters related to 64QAM for use by the wireless device if it is determined that no repetitions are being used.

According to another example embodiment, a method in a wireless device is disclosed. The method comprises receiving downlink control information (DCI) from a network node, wherein the wireless device is capable of using 64-Quadrature Amplitude Modulation (64QAM) when configured in a first coverage enhancement mode and configured to use 64QAM when configured in the first coverage enhancement mode. The method comprises determining, based on the received DCI, a modulation format and transport block size (TBS) for use by the wireless device for 64QAM. In certain embodiments, one or more of the following may apply:
determining, based on the received DCI, a modulation format and transport block size (TBS) for use by the wireless device for 64QAM may comprise one of:
if a frequency hopping flag value of the DCI is zero, determining a modulation and coding scheme (MCS) index to be used for determining the modulation format and TBS based on a 4 bit value of an MCS field; and
if the frequency hopping flag value of the DCI is one, determining the MCS index to be used for determining the modulation format and TBS by adding 16 to the 4 bit value of the MCS field;
determining, based on the received DCI, a modulation format and TBS for use by the wireless device for 64QAM may comprise one of:
using a frequency hopping flag as a most significant bit together with an MCS field to determine an MCS index;
using a frequency hopping flag as a least significant bit and an MCS field as four most significant bits;
determining the modulation format and TBS for use by the wireless device for 64QAM may be further based on one or more criteria;
the one or more criteria may comprise one or more of:
a category of the wireless device; and
a configured bandwidth;
determining, based on the received DCI, a modulation format and TBS for use by the wireless device for 64QAM may comprise:
determining the modulation format and TBS based on one or more of:
a frequency hopping flag; and
a DCI subframe repetition number field.

According to another example embodiment, a wireless device is disclosed. The wireless device comprises processing circuitry. The processing circuitry is configured to receive downlink control information (DCI) from a network node, wherein the wireless device is capable of using 64-Quadrature Amplitude Modulation (64QAM) when configured in a first coverage enhancement mode and configured to use 64QAM when configured in the first coverage enhancement mode. The processing circuitry is configured to determine, based on the received DCI, a modulation format and transport block size (TBS) for use by the wireless device for 64QAM.

Additional information about the various embodiments described herein is further exemplified below.

Increased PDSCH Spectral Efficiency for MTC

The Rel-15 WI on "Even further enhanced MTC for LTE", Tdoc RP-170732, "New WID on Even further enhanced MTC for LTE", RAN #75, March 2017 has the following WI objective for machine-type communications for BL/CE UEs:

Increased PDSCH spectral efficiency [RAN1 lead, RAN2, RAN4]

Specify optional support for 64QAM for unicast PDSCH (no UE peak rate increase is intended).

Several contributions addressed this topic at the RAN1 #88bis meeting, and the following agreements were made:

Support for 64QAM for non-repeated unicast PDSCH in connected mode in CE Mode A is introduced.

The feature is enabled/disabled by eNB via UE-specific signaling.

Unless enabled, UE shall assume no use of 64QAM.

The MCS field in DCI format 6-1A is [FFS: 4 or 5 bits] in UE-specific search space.

The max TBS for each UE category and max PDSCH channel bandwidth support is the same as Rel-14.

This implies that N_soft is also the same as Rel-14.

FFS details of MCS, TBS and CQI tables for the support of 64QAM.

DCI and MCS/TBS Tables

First, the MCS field in DCI format 6-1A and its relation to the MCS and TBS tables will be discussed. Regarding the MCS field, two options are presented above:

Using a 4 bit MCS field. This preserves the MPDCCH performance, but some additional mechanism is required to address the MCS/TBS entries associated with 64QAM. This is discussed more below.

Using a 5 bit MCS field, which means that the legacy MCS/TBS tables for Rel-8 LTE can be reused. Thus, it is the most straightforward solution. The drawback is a slight increase in DCI size and a slight decrease in MPDCCH performance.

For the 4 bit solution, a remapping of the rows in the TBS table can be done, similar to what was done when supporting larger PUSCH TBS sizes for Rel-14 feMTC UEs. One identified drawback with this approach is that the scheduling granularity is negatively affected. Furthermore, it has been agreed that the 64QAM functionality shall be introduced without increasing the maximum transport block size. Consequently, the number of applicable TBS table entries will differ largely between different number of used PRBs, which means that an optimal selection for remapping of rows may be difficult. This may be solved by using a remapping mechanism that varies between PRB columns to be able to use the 4 bit MCS field in an optimal way. However, such schemes appear unnecessarily complex for the purpose. Yet another difficulty is that different UE categories and/or configured bandwidth has different maximum block sizes, and the remapping of rows must thus take this as well into account.

One proposal is that 5 bits are used for indicating the modulation format and the TBS size. An alternative to introducing an additional bit in the MCS field would be to remap some existing bit in the DCI. Since it has been agreed that the 64QAM functionality is only applicable for transmissions without repetitions, some bits will become redundant and can thus be reinterpreted for this purpose instead. One such possibility would be to use the frequency hopping flag, which is redundant when not using repetitions. For example, the frequency hopping flag may be reinterpreted as the MSB in a 5 bit MCS index, with the MCS field being used as the 4 LSB. This means that if the frequency hopping flag is zero, the 4 bit MCS field is interpreted as 0-15, and if the frequency hopping flag is one, the 4 bit MCS field is interpreted as 16-31. By using this approach, it is not required to increase the DCI size, while maintaining the full flexibility of addressing the whole range in the present MCS and TBS tables without any loss in granularity.

Given the condition that the maximum transport block sizes should be retained also when allowing 64QAM modulation, there is still a need to make sure the TBS sizes are limited accordingly depending on the UE category and/or configured bandwidth. Our preference is to do this by introducing a rule and/or formula that limits the TBS to the maximum applicable value for the UE category and/or configured bandwidth. This way several large tables that are almost identical to subsets of the existing ones can be avoided. In particular the table for a higher category UE configured to operate in CEModeA with 64QAM in 20 MHz bandwidth would be very large and almost identical to the existing TBS table. When the network signals that the maximum applicable TBS be used, a proposal is that the network always uses the lowest possible TBS index that indicates a value that is larger than or equal to this maximum TBS.

Proposal 1 When 64QAM is configured and the DCI indicates that PDSCH is transmitted without repetitions, reinterpret the frequency hopping flag as the MSB in a 5 bit MCS index to be used in the MCS and TBS tables.

Proposal 2 Reuse the existing Rel-8 MCS and TBS tables.

Proposal 3 Introduce a rule and/or formula to limit the TBS to the maximum applicable value for the UE category and/or configured bandwidth.

Proposal 4 When several TBS indices in the TBS table indicate the same TBS after limiting to the maximum applicable TBS, the UE shall expect only the minimum of these TBS indices to be used by the network.

CQI Table Modification

The existing CQI table applicable for BL/CE UEs, Table 7.2.3-3 in 36.213, include only entries associated with 16QAM entries.

TABLE 7.2.3-3

4-bit CQI Table 3

| CQI index | modulation | code rate × 1024 × $R^{CSI}$ | efficiency × $R^{CSI}$ |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | Reserved | Reserved | Reserved |
| 12 | Reserved | Reserved | Reserved |
| 13 | Reserved | Reserved | Reserved |
| 14 | Reserved | Reserved | Reserved |
| 15 | Reserved | Reserved | Reserved |

As can be seen, there are 5 reserved entries not used so far, and it has been proposed reuse some entries associated with 64QAM for Rel-8 LTE UEs, Table 7.2.3-1.

TABLE 7.2.3-1

4-bit CQI Table

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Since there are 6 such entries, one need either to skip one entry or use a coarser code rate grid. However, the highest code rate 948/1024 typically corresponds to the highest TBS value for each PRB column. And since the TBS table is pruned anyway due to the limit on maximum TBS for each category and/or configured bandwidth, the highest code rate can be used in relation to repetitions in a very few limited cases. Thus, a proposal is to reuse the entries associated with CQI index 10-14 in Table 7.2.3-1 in place of the Reserved entries associated with CQI index 11-15 in 7.2.3-3. It is suggested that a UE is not expected to report these values unless it is configured with 64QAM modulation.

Proposal 5 Reuse entries associated with CQI index 10-14 in Table 7.2.3-1 in 36.213 in place of the reserved entries in the CQI table applicable for Rel-13 BL/CE UEs.

Proposal 6 A BL/CE UE is not expected to report CQI values 11-15 unless it is configured with 64QAM modulation.

When considering aspects of introducing 64QAM in order to increase the PDSCH spectral efficiency. The following are proposals:

Proposal 1 When 64QAM is configured and the DCI indicates that PDSCH is transmitted without repetitions, reinterpret the frequency hopping flag as the MSB in a 5 bit MCS index to be used in the MCS and TBS tables.

Proposal 2 Reuse the existing Rel-8 MCS and TBS tables.

Proposal 3 Introduce a rule and/or formula to limit the TBS to the maximum applicable value for the UE category and/or configured bandwidth.

Proposal 4 When several TBS indices in the TBS table indicate the same TBS after limiting to the maximum applicable TBS, the UE shall expect only the minimum of these TBS indices to be used by the network.

Proposal 5 Reuse entries associated with CQI index 10-14 in Table 7.2.3-1 in 36.213 in place of the reserved entries in the CQI table applicable for Rel-13 BL/CE UEs.

Proposal 6 A BL/CE UE is not expected to report CQI values 11-15 unless it is configured with 64QAM modulation.

Certain embodiments of the present disclosure may provide one or more technical advantages. As one example, certain embodiments may advantageously make it possible to schedule a BL/CE UE with 64QAM modulation without increasing the size of the DCI format. In some cases, this is achieved by re-interpreting bits that become redundant when 64QAM can be applied. Other advantages may be readily apparent to one having skill in the art. Certain embodiments may have none, some, or all of the recited advantages.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
AP Access Point
BL Bandwidth-Reduced Low-Complexity
BS Base Station
BSC Base Station Controller
BTS Base Transceiver Station
Cat-M1 Category M1
Cat-M2 Category M2
CEModeA Coverage Enhancement Mode A
CEModeB Coverage Enhancement Mode B
CPE Customer Premises Equipment
D2D Device-to-device
DAS Distributed Antenna System
DCI Downlink Control Information
DL Downlink
eMTC Enhanced Machine-Type Communication
feMTC Further Enhanced Machine-Type Communication
eNB evolved Node B
FDD Frequency Division Duplex
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MCS Modulation level and coding scheme
MPDCCH MTC Physical Downlink Control Channel
MSR Multi-standard Radio
MTC Machine-Type Communication
NAS Non-Access Stratum
OFDM Orthogonal Frequency Division Multiplexing
PDCCH Physical Downlink Control Channel
PDSCH Physical Downlink Shared Channel
PRB Physical Resource Block
PSTN Public Switched Telephone Network
PUSCH Physical Uplink Shared Channel
PUCCH Physical Uplink Control Channel
QAM Quadrature Amplitude Modulation
RB Resource Block RI Rank Indicator
RNC Radio Network Controller
RRC Radio Resource Control
RRH Remote Radio Head
RRU Remote Radio Unit
TBS Transport Block Size
TDD Time Division Duplex
UCI Uplink Control Information
UE User Equipment
UL Uplink
WAN Wide Area Network

The invention claimed is:

1. A method performed by a network node for indicating a modulation and coding scheme (MCS) for a wireless device operating in a coverage enhancement mode, wherein the wireless device operates with a first modulation and coding scheme using physical downlink shared channel repetitions and with a second modulation and coding scheme without using physical downlink shared channel repetitions, and wherein the second modulation and coding scheme is a higher order of modulation and coding than the first modulation and coding scheme, the method comprising:
configuring, when physical downlink shared channel repetitions are not used, the downlink control information to indicate one or more parameters related to the second modulation and coding scheme, the indication comprising at least a 4-bit modulation and coding scheme field of the first modulation and coding scheme and one or more downlink control information field bits which are used in relation to repetitions when repetitions of a physical downlink shared channel are used, and wherein a MCS index the wireless device should use for determining the modulation format and transport block size is given by adding 16 to the 4-bit value of the modulation and coding scheme field.

2. The method of claim 1 wherein the one or more downlink control information field bits, which are used in relation to repetitions when repetitions of a physical downlink shared channel are used, comprises a frequency hopping flag bit.

3. A network node for indicating a modulation and coding scheme (MCS) for a wireless device operating in a coverage enhancement mode, wherein the wireless device operates with a first modulation and coding scheme using physical downlink shared channel repetitions and with a second modulation and coding scheme without using physical downlink shared channel repetitions, and wherein the second modulation and coding scheme is a higher order of modulation and coding than the first modulation and coding scheme, the network node comprising a transceiver, processing circuitry and a memory, wherein the processing circuitry is configured to:
configure, when physical downlink shared channel repetitions are not used, the downlink control information to indicate one or more parameters related to the second modulation and coding scheme, the indication comprising at least a 4-bit modulation and coding scheme field of the first modulation and coding scheme and one or more downlink control information field bits which are used in relation to repetitions when repetitions of a physical downlink shared channel are used, and wherein a MCS index the wireless device should use for determining the modulation format and transport block size is given by adding 16 to the 4-bit value of the modulation and coding scheme field.

4. The network node of claim 3 wherein the one or more downlink control information field bits, which are used in relation to repetitions when repetitions of a physical downlink shared channel are used, comprises a frequency hopping flag bit.

5. The network node of claim 4 wherein the frequency hopping flag bit is the most significant bit of the indicated modulation and coding scheme field.

6. The network node of claim 3, wherein a modulation and transport block size index table for physical downlink shared channel is reused for the indication of the one or more parameters related to the second modulation and coding scheme.

7. The network node of claim 3, wherein the processing circuitry is further configured to determine whether repetitions of a physical downlink shared channel are being used.

8. The network node of claim 7, wherein the processing circuitry is further configured to configure, when physical downlink shared channel repetitions are used, the downlink control information to indicate the first modulation and coding scheme and to configure, when physical downlink shared channel repetitions are not used, the downlink control information to indicate no physical downlink shared channel repetitions.

9. The network node of claim 3, wherein the processing circuitry is further configured to determine that the wireless device supports the second modulation and coding scheme when operating in the coverage enhancement mode.

10. The network node of claim 3, wherein the first modulation and coding scheme is one of QPSK and 16QAM and the second modulation and coding scheme is 64QAM.

11. A method performed by a wireless device for determining a modulation and coding scheme (MCS) for a wireless device for operating in a coverage enhancement mode, wherein a first modulation and coding scheme uses physical downlink shared channel repetitions and a second modulation and coding scheme does not use physical downlink shared channel repetitions, and wherein the second modulation and coding scheme is a higher order of modulation and coding than the first modulation and coding scheme, the method comprising:
receiving a downlink control information comprising an indication to one or more parameters related to the second modulation and coding scheme when physical downlink shared channel repetitions are not used, the indication comprising at least a 4-bit modulation and coding scheme field of the first modulation and coding scheme and one or more downlink control information field bits which are used in relation to repetitions when repetitions of a physical downlink shared channel are used, and wherein a MCS index the wireless device should use for determining the modulation format and transport block size is given by adding 16 to the 4-bit value of the modulation and coding scheme field.

12. The method of claim 11 wherein the one or more downlink control information field bits, which are used in relation to repetitions when repetitions of a physical downlink shared channel are used, comprises a frequency hopping flag bit.

13. The method of claim 12 wherein the frequency hopping flag bit is the most significant bit of the indicated modulation and coding scheme field.

14. The method of claim 11, wherein a modulation and transport block size index table for physical downlink shared channel is reused for the indication of the one or more parameters related to the second modulation and coding scheme.

15. The method of claim 11, further comprising determining whether repetitions of a physical downlink shared channel are being used.

16. The method of claim 15 further comprising receiving the downlink control information, when physical downlink shared channel repetitions are used and determining the downlink control information to indicate the first modulation and coding scheme.

17. The method of claim 11, wherein the first modulation and coding scheme is one of QPSK and 16QAM and the second modulation and coding scheme is 64QAM.

18. A wireless device for determining a modulation and coding scheme (MCS) for operating in a coverage enhancement mode, wherein a first modulation and coding scheme uses physical downlink shared channel repetitions and a second modulation and coding scheme does not use physical downlink shared channel repetitions, and wherein the second modulation and coding scheme is a higher order of modulation and coding than the first modulation and coding scheme, the wireless device comprising a transceiver, processing circuitry and a memory, wherein the processing circuitry is configured to:
    receive a downlink control information comprising an indication to one or more parameters related to the second modulation and coding scheme when physical downlink shared channel repetitions are not used, the indication comprising at least a 4-bit modulation and coding scheme field of the first modulation and coding scheme and one or more downlink control information field bits which are used in relation to repetitions when repetitions of a physical downlink shared channel are used, and wherein a MCS index the wireless device should use for determining the modulation format and transport block size is given by adding 16 to the 4-bit value of the modulation and coding scheme field.

19. The wireless device of claim 18 wherein the one or more downlink control information field bits, which are used in relation to repetitions when repetitions of a physical downlink shared channel are used, comprises a frequency hopping flag bit.

20. The wireless device of claim 19 wherein the frequency hopping flag bit is the most significant bit of the indicated modulation and coding scheme field.

21. The wireless device of claim 18, wherein a modulation and transport block size index table for physical downlink shared channel is reused for the indication of the one or more parameters related to the second modulation and coding scheme.

22. The wireless device of claim 18, wherein the processing circuitry is further configured to determine whether repetitions of a physical downlink shared channel are being used.

23. The wireless device of claim 22, wherein the processing circuitry is further configured to receive the downlink control information, when physical downlink shared channel repetitions are used and to determine the downlink control information to indicate the first modulation and coding scheme.

24. The wireless device of claim 18, wherein the first modulation and coding scheme is one of QPSK and 16QAM and the second modulation and coding scheme is 64QAM.

* * * * *

UNITED STATES PATENT AND TRADEMARK OFFICE
CERTIFICATE OF CORRECTION

| | |
|---|---|
| PATENT NO. | : 11,291,009 B2 |
| APPLICATION NO. | : 16/610967 |
| DATED | : March 29, 2022 |
| INVENTOR(S) | : Wallén et al. |

It is certified that error appears in the above-identified patent and that said Letters Patent is hereby corrected as shown below:

In the Specification

In Columns 11 and 12, Line 11, delete "806" and insert -- 808 --, therefor.

In the Claims

In Column 28, Lines 33-34, in Claim 11, delete "a wireless device" and insert -- the wireless device --, therefor.

Signed and Sealed this
Eleventh Day of October, 2022

Katherine Kelly Vidal
*Director of the United States Patent and Trademark Office*